United States Patent

[11] 3,581,788

| [72] | Inventor | Clifton L. McCoy<br>R.R. 2 Box 685, Oklahoma City, Okla. 73122 |
|---|---|---|
| [21] | Appl. No. | 863,183 |
| [22] | Filed | Oct. 2, 1969 |
| [45] | Patented | June 1, 1971 |

[54] NUT SHELLING DEVICE
5 Claims, 3 Drawing Figs.

| [52] | U.S. Cl. | 146/13 |
|---|---|---|
| [51] | Int. Cl. | A23n 5/00 |
| [50] | Field of Search | 146/10, 13, 16 |

[56] References Cited
UNITED STATES PATENTS

| 1,129,213 | 2/1915 | McEwan | 146/13 |
|---|---|---|---|
| 1,400,099 | 12/1921 | Pueppke | 146/13 |

*Primary Examiner*—Willie G. Abercrombie
*Attorney*—Robert K. Rhea

ABSTRACT: A plurality of oppositely disposed cooperating blades are mounted respectively on a base and a lever pivotally connected with and movable toward and away from the base so that opposite ends and side portions of a nut hull are cut off when the nut is positioned on the base mounted blades and the lever mounted blades are moved toward the base.

PATENTED JUN 1 1971

CLIFTON L. McCOY
INVENTOR.

BY

Robert K. Rhea
AGENT

CLIFTON L. McCOY
INVENTOR

BY
Robert K. Rhea
AGENT

NUT SHELLING DEVICE

BACKGROUND OF THE INVENTION

1. Field of the Invention

The present invention relates to nut shelling devices and more particularly to a nut sheller having adjustable oppositely disposed cooperating sets of blades movable toward and away from each other in a nut hull cutting and releasing action.

In shelling nuts it is desirable that the meat of the nut, when removed from the shell, remains substantially intact. This, in many instances, is difficult to achieve for the reason that most nut crackers or shells comprise opposing jaws which are moved toward each other from opposing sides or ends of the nut hull. In pecan nuts it is desirable that the meat of the nut be removed from the shell in the form of halves. Most pecan shelling devices comprise a pair of opposing jaws, each having a socket or concave recess therein, so that opposing end portions of the pecan hull is nested by these sockets wherein pressure applied to the nut hull crushes the sidewalls thereof. However, it is not always possible to limit the movement of the jaws toward each other and prevent crushing of the nut halves.

The present invention provides a means of shelling pecans and retaining the nut meat halves substantially intact by cutting off opposing sides and end portions of the nut hull so that the pecan halves separate easily from the severed portions of the hull.

2. Description of the Prior Art.

The prior art shown by U.S. Pat. Nos. 1,492,131; 1,586,749; 1,609,352; 2,071,853 and 2,405,303 disclose palm nut shelling devices wherein upper and lower sets of blades are generally arranged in radial relation for moving longitudinally of the nut hull.

SUMMARY OF THE INVENTION

A horizontally supported base is provided with a vertical opening therethrough. A pair of angle iron blades, having upwardly directed sharpened edges, are adjustably secured to the upper surface of the base around the aperture. Oppositely disposed cooperatively positioned upper blades are adjustably secured to a lever, intermediate its ends, pivotally connected at one end to the base for movement toward and away from the lower blades and cutting a nut hull when positioned on the lower blades. A spring urged plunger, mounted on the lever, forcibly ejects nuts meats or hulls impinged between the blades after the hull cutting action. The substantially rectangular area circumscribed by the cooperating cutting edges of the blades trims off opposing end and side portions of nut hulls, such as a pecan, thus leaving the nut meat halves thereof substantially intact.

The principal object of this invention is to provide a nut shelling device having a plurality of oppositely disposed adjustable cooperating blades forming upper and lower sets for simultaneously shearing off ends and sides of nut hulls when positioned between the sets of blades.

DESCRIPTION OF THE PREFERRED EMBODIMENT

Figure 1:
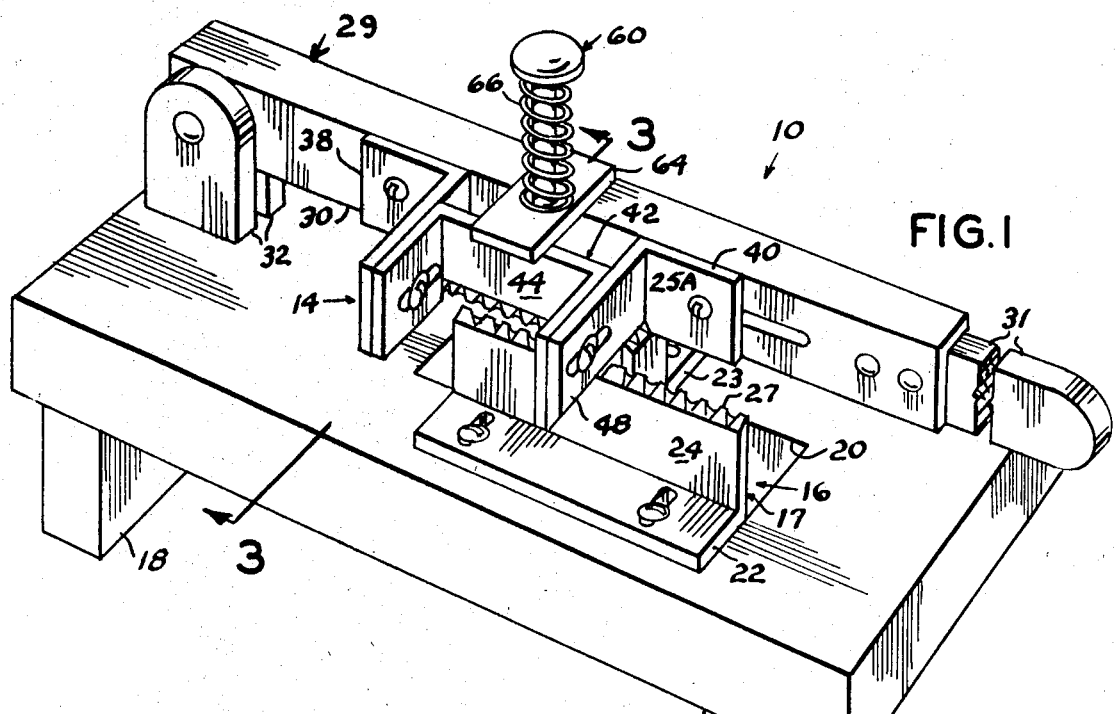
FIG. 1 is a perspective view of the device.

Like characters of reference designate like parts in those figures of the drawings in which they occur.

In the drawings:

The reference numeral 10 indicates the device, as a whole, comprising a horizontal base 12 and upper and lower sets of cutting blades 14 and 16, respectively. The base 12 is supported by leg members 18. The base is provided with a substantially rectangular vertical aperture 20. The lower set of blades 16 comprises two blades 17 and 19 which are substantially mirror images of each other, preferably formed of right angular metallic material, having a base flange 22 and 23, respectively, flatly contacting the upper surface of the base 12 aNd secured thereto, as by bolts or screws. The base flange 22 is slotted for lateral movement while the base flange 23 is slotted for longitudinal movement. The other or upstanding flanges 24 and 25 have one end portion extending beyond the respective base connected flanges 22 and 23 to turned laterally opposite the respective flange 22 and 23 to form the respective foot portion 24A and 25A of L-shapes. The upper edge portions of these flanges are sharpened by beveling the upper edge portion thereof. This beveled edge is provided with V-shaped recesses or notches to form a toothlike cutting edge 27 which I have found readily severs or cuts a nut hull.

An elongated angle iron lever 29 is pivotally connected at one end between a pair of upstanding ears 32 for vertical pivoting movement of the lever toward and away from the upper surface of the base. A handle 31 is connected to the free end portion of the lever 29. The depending longitudinal side edge surface of one flange 30 of the lever 29 lies in the vertical plane of the cutting edge 27 formed on the flange 25 of the blade 19 and extending longitudinally of the aperture 20. A portion of the depending flange of the lever 29 is turned laterally, as at 33, in the vertical plane of the foot portion 24A of the blade 17. The depending edge of this lever portion 33 and a portion of the flange 30, extending toward the handle 31, is similarly sharpened so that its depending sharpened edge 37 cooperatively overlies, in aligned relation, the upwardly disposed cutting edges 27 of the lower blade 19.

A pair of right angle brackets 38 an 40 are adjustably connected with the lever flange 30, by screws within slots formed in the flange 30, at opposite ends of the sharpened edge 37 on that side toward the lower blade 17. The free end portions of the brackets 38 and 40 are slotted to cooperatively bolt a U-shaped member 42 for adjustment between the brackets laterally of the lever 29. The depending edge of the bight portion 44 of the U-shaped member is provided with a similarly sharpened edge 46 overlying and in the vertical plane of the upwardly disposed sharpened edge 27 of the lower blade 17. The depending edge of the laterally extending arm 48 of the bracket 40 is similarly sharpened, as at 50, to coincide with the foot portion 25A of the lower blade 19.

Figure 3:
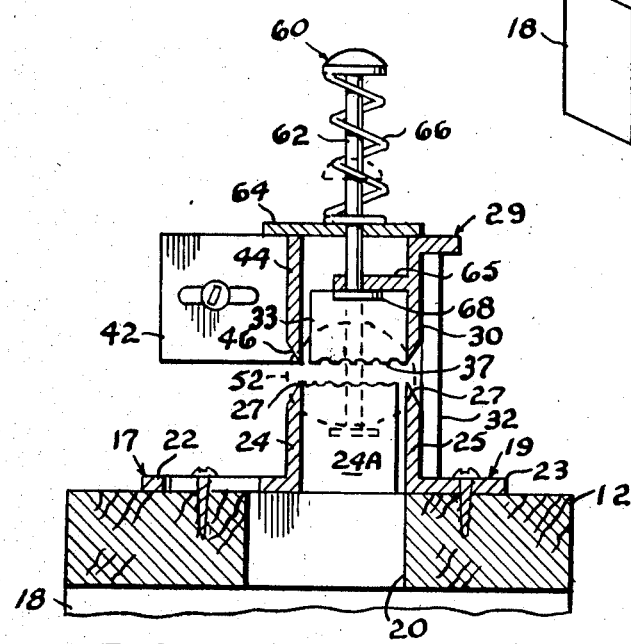
Figure 2:
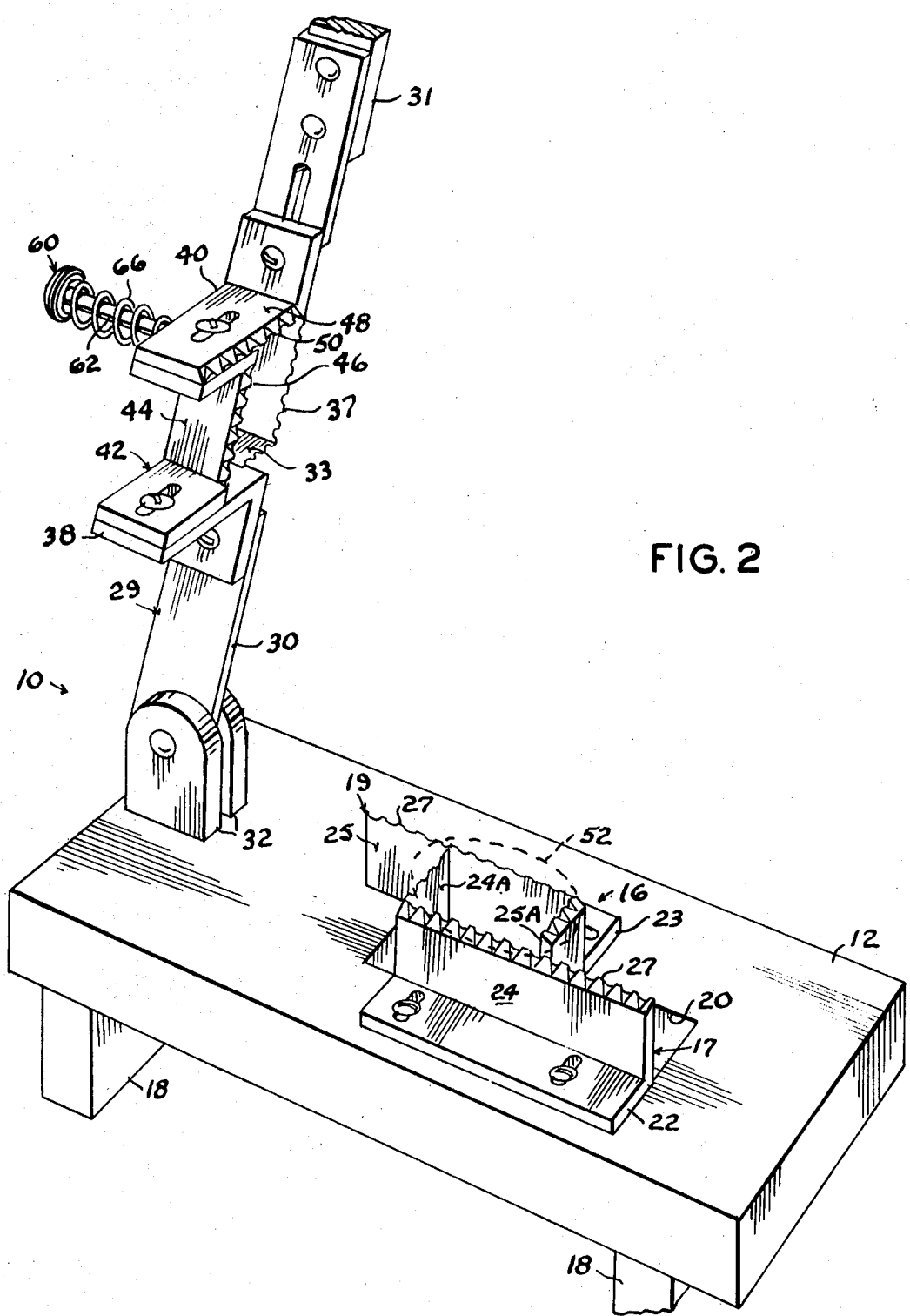
FIG. 2 is a view similar to FIG. 1 with the blade supporting lever in raised position for positioning a pecan, indicated by dotted lines, on the lower blades; and, FIG. 3 is a vertical cross-sectional view, to a different scale, taken substantially along the line 3-3 of FIG. 1.

As shown more clearly in FIG. 3, the aligned edges of the respective upper and lower blades thus form cooperating cutting edges having outer beveled surfaces so that a nut, indicated by the dotted line 52, when placed in supporting relation on the cutting edges of the lower blades, have the respective end and side portions of its hull severed or cut off wherein the cutoff portions of the hull are moved outwardly of the remainder of the nut so that no pressure is applied to the meat of the nut to prevent its being crushed or mutilated. This cutting action is accomplished by manually lowering the lever 29 toward the base. After cutting off the sides and end portions of the nut 52, the remainder thereof falls by gravity through the base opening 20. Ejection plunger means 60 is provided for removing severed nuts from the confines of the blades, in the event the nut 52 becomes lodges therein. The ejection plunger comprises a boltlike member 62 vertically slidably received by an aperture formed in a support plate 64 connected with the upper edge surface of the lever 29 projecting laterally across the rectangular opening defined by the lever 29, brackets 38 and 40 and U-shaped member 42. A guide arm 65, attached to the lever flange 30, prevents any binding action between the bolt 62 and plate 64. A spring 66, surrounding the bolt 62, normally maintains the bolt in an elevated position while a washer 68, or the like, secured to the inwardly directed end of the bolt, contacts the nut 52 to force it downwardly through the base opening 20 when the bolt 62 is manually depressed against the pressure of the spring 66.

Obviously the invention is susceptible to changes or alterations without defeating its practicability, therefore, I do not wish to be confined to the preferred embodiment shown in the drawings and described herein.

I claim:
1. A nut hull cutting device, comprising:
   a horizontally disposed base;
   a lever connected at one end portion with one end portion of said base for vertical pivoting movement toward and from the upper surface of said base; and,
   a set of blades defining a rectangular nut hull receiving socket mounted, respectively, on said lever in cooperating relation for severing opposing end and side portions of a nut hull placed therebetween.
2. Structure as specified in claim 1 in which the blades of each said set are adjustable with respect to each other and the blades of the opposite set for altering the dimensions of the rectangular nut hull receiving socket.
3. Structure as specified in claim 2 in which said blades comprise angle iron members,
   said blades each having a sharpened edge, each said sharpened edge having notches therein defining a series of teeth.
4. Structure as specified in claim 3 in which said base is provided with a vertical opening aligned with said sets of blades for the passage of nut meats and hulls.
5. Structure as specified in claim 4 and further including a spring urged plunger support by said lever and movable toward and from the opening in said base.